May 24, 1927.

M. W. McCONKEY

AUTOMOBILE COLLISION BUMPER

Filed Jan. 30, 1925

1,629,806

Inventor

*Montgomery W. McConkey*

By
Attorneys

Patented May 24, 1927.

1,629,806

UNITED STATES PATENT OFFICE.

MONTGOMERY W. McCONKEY, OF FERNDALE, MICHIGAN, ASSIGNOR TO GENERAL MOTORS CORPORATION, OF DETROIT, MICHIGAN, A CORPORATION OF DELAWARE.

AUTOMOBILE COLLISION BUMPER.

Application filed January 30, 1925. Serial No. 5,776.

This invention relates to automobile collision bumpers and has for its object the provision of a bumper which is inexpensive to manufacture and which is exceptionally strong in construction. In one desirable arrangement the bumper is made of two substantially identical parts which together form a pair of vertically spaced impact bars adapted to extend across the end of an automobile. The opposite ends of each of these bars are bent rearwardly and inwardly and vertically, one of the ends being considerably longer than the other and additionally bent forward against the rear of the impact portions. The shorter end of each of the bars is secured directly to the longer end of the opposite bar, and the two longer end portions are brought together at the back of the impact portions of the two bars and connected together and to the impact portions by a suitable clamp.

The above and other desirable details of construction will be apparent from the following description of one illustrative embodiment shown in the accompanying drawings, in which.

Figure 1:
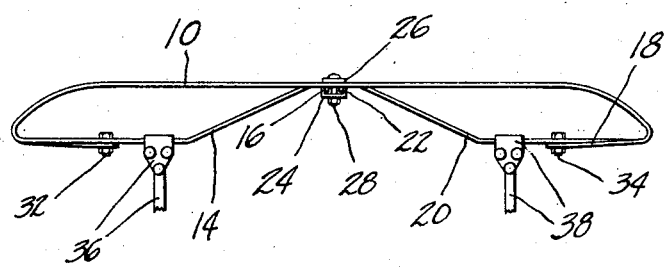
Figure 1 is a top plan view of the bumper.
Figure 2:
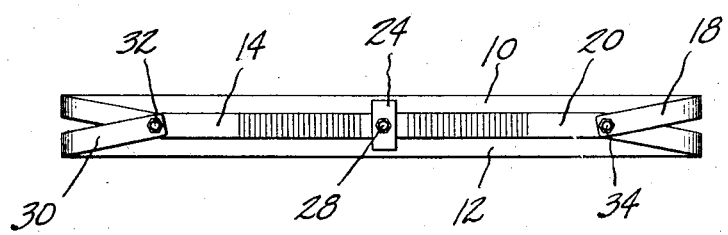
Figure 2 is a rear elevation of the bumper with the supporting brackets or clamps removed.

The bumper comprises generally upper and lower vertically spaced substantially parallel impact bars 10 and 12 adapted to extend across one end of an automobile. In the particular arrangement shown in the drawings the bar 10 is bent rearwardly and inwardly and then forwardly to form a relatively longer looped end portion 14 terminating substantially in the plane of and between the impact portions and there bent in the form of a hook 16. At its opposite end the bar 10 is bent rearwardly and inwardly and downwardly to form a relatively short end extension 18.

The bar 12 is, in effect, like the bar 10 except that it is reversed with respect thereto. That is, the right end of the bar 12 is bent rearwardly and inwardly and upwardly, and then forwardly to form a relatively longer looped end portion 20 terminating in a hook 22 adjacent the hook 16. A channel member 24 engaging the hooks 16 and 22, together with a front plate 26 and a bolt 28, forms a clamp securing the ends of the looped portions 14 and 20 to each other and to the impact portions of the bars. The opposite end of the bar 12 is bent rearwardly and inwardly and upwardly to form a relatively short end extension 30 secured by a bolt 32 to the looped portion 14 of the bar 10, and the end extension 18 is similarly secured by a bolt 34 to the loop portion 20 of the bar 12. The bumper as a whole may be supported on an automobile chassis by suitable brackets or clamps 36 and 38.

While one illustrative embodiment of the invention has been described in detail, it is not my intention to limit its scope to that particular embodiment, or otherwise than by the terms of the appended claim.

I claim:

An automobile collision bumper comprising vertically spaced substantially parallel impact bars adapted to extend across one end of an automobile, the ends of the upper bar being bent rearwardly and inwardly and downwardly and the ends of the lower bar being bent rearwardly and inwardly and upwardly, opposite ends of the two bars being relatively longer and additionally bent forwardly to terminate adjacent the center of the impact bars, the other ends of the two bars being relatively short and secured respectively to the longer ends of the opposite bars, the forwardly bent end portions of the bars terminating in hooked extremities, in combination with a channel member engaging said hooked extremities and means for clamping the channel member to the central portions of the impact bars.

In testimony whereof I affix my signature.

MONTGOMERY W. McCONKEY.